United States Patent
Emani et al.

(10) Patent No.: US 12,289,669 B2
(45) Date of Patent: Apr. 29, 2025

(54) CONFIGURING AN ACCESS POINT TO AVOID DUPLICATE NETWORK IDENTIFIERS

(71) Applicant: Silicon Laboratories Inc., Austin, TX (US)

(72) Inventors: Krishna Chaitanya Suryavenkata Emani, Telangana (IN); Venkata Naganjaneya Sairam Sriram, Andhra Pradesh (IN)

(73) Assignee: Silicon Laboratories Inc., Austin, TX (US)

( * ) Notice: Subject to any disclaimer, the term of this patent is extended or adjusted under 35 U.S.C. 154(b) by 360 days.

(21) Appl. No.: 17/839,597

(22) Filed: Jun. 14, 2022

(65) Prior Publication Data

US 2023/0403636 A1 Dec. 14, 2023

(51) Int. Cl.
| | |
|---|---|
| *H04W 48/14* | (2009.01) |
| *H04W 48/16* | (2009.01) |
| *H04W 84/12* | (2009.01) |
| *H04W 88/08* | (2009.01) |

(52) U.S. Cl.
CPC ........... *H04W 48/14* (2013.01); *H04W 48/16* (2013.01); *H04W 84/12* (2013.01); *H04W 88/08* (2013.01)

(58) Field of Classification Search
CPC ..... H04W 48/14; H04W 48/16; H04W 84/12; H04W 88/08
See application file for complete search history.

(56) References Cited

U.S. PATENT DOCUMENTS

| | | | | |
|---|---|---|---|---|
| 10,219,203 | B2 * | 2/2019 | Zhang | H04W 48/16 |
| 10,412,083 | B2 * | 9/2019 | Zou | H04W 12/08 |
| 10,924,986 | B2 * | 2/2021 | Fan | H04W 88/08 |
| 11,937,174 | B2 * | 3/2024 | Lin | H04W 48/16 |

OTHER PUBLICATIONS

7Signal, Inc., "Boosting Wi-Fi Performance with Beacon and Beacon Interval" http://www.7signal.com/news/blog/controlling-beacons-boosts-wi-fi-performance, Aug. 24, 2016, 3 Pages.

Silicon Labs, "RS9116 n-Link and WiSeConnect™ Single Chip Wi-Fi@ and Dual-Mode Bluetooth® 5 Wireless Connectivity Solutions," Jun. 2021, , V1.0.10, 82 Pages.

U.S. Appl. No. 17/547,396, filed Dec. 10, 2021, entitled "System, Method And Apparatus To Reduce Error In Unused Tones In Partial Bandwidth Wireless Transmission System," by Sriram Mudulodu, Manoj Kumar Medam, Rambabu Katla, Anil Kumar Adavally and Aravinth Kumar Ayyappannair Radhadevi, 31 pgs.

* cited by examiner

*Primary Examiner* — Chandrahas B Patel
(74) *Attorney, Agent, or Firm* — Trop, Pruner & Hu, P.C.

(57) ABSTRACT

In one embodiment, a method includes: receiving, in an access point, a configuration request from a user, the configuration request comprising a first SSID; in response to the user request, entering into a monitor mode to identify one or more existing SSIDs of one or more existing access points in a local environment with the access point; and informing the user if the first SSID matches at least one of the existing SSIDs.

20 Claims, 4 Drawing Sheets

CONFIGURING AN ACCESS POINT TO AVOID DUPLICATE NETWORK IDENTIFIERS

BACKGROUND

An access point (AP), also referred to as a "wireless access point," is a device that creates a wireless local area network (WLAN). Many different types of entities, including businesses, offices, retail stores, and other public or private places utilize APs to enable a variety of different devices including smartphones or other personal devices, tablets, laptops, smart TVs and so forth to wirelessly communicate, e.g., according to an IEEE 802.11 protocol (a so-called "Wi-Fi" protocol).

An access point connects to a wired router, switch or hub via an Ethernet cable or as a mobile hotspot to a wireless network (e.g., LTE/4G or 5G) as a backhaul, and projects a wireless signal within the WLAN. A given access point can handle many simultaneous connections. By installing multiple access points throughout a space, a user can roam freely within the space without experiencing network interruptions, since devices can move from one access point to another without losing a connection.

There may be instances when having multiple access points in close proximity can cause concerns. For example whenever a user configures a service set identifier (SSID) for an access point, the user may not be aware of SSID's of other access points in the vicinity. This might lead to a situation where two users may configure same SSID but with different security requirements/passwords. Such situation may lead to a bad user experience for anyone trying to connect/associate to the access point. This is so, since only one of the two APs might be listed in scan results of a station user interface (UI). If the user selects the SSID and connection is attempted to the incorrect access point, the user will not be able to connect/associate to the required access point, leading to extremely bad user experience and lack of internet connectivity.

SUMMARY OF THE INVENTION

In one aspect, a method includes: receiving, in an access point, a configuration request from a user, the configuration request comprising a first SSID; in response to the user request, entering into a monitor mode to identify one or more existing SSIDs of one or more existing access points in a local environment with the access point; and informing the user if the first SSID matches at least one of the existing SSIDs.

In an embodiment, the method further comprises configuring the access point with the first SSID in response to identifying no existing SSIDs in the local environment that match the first SSID. The method also may include seeking a confirmation of the user to configure the access point with the first SSID, in response to the first SSID matching the at least one of the existing SSIDs. Configuring the access point may be terminated in response to receiving a user indication to use a different SSID.

In an embodiment, configuring the access point further comprises: configuring the access point for a security mode; and configuring a password for the access point identified by the user. Configuring the access point further comprises storing the first SSID and the password in a non-volatile memory of the access point, and thereafter, rebooting the access point. The method may further include preventing the access point from being configured with the first SSID in response to the first SSID matching the at least one of the existing SSIDs.

In an embodiment, the method further includes in the monitor mode: receiving a first plurality of messages of a first plurality of existing access points; receiving a second plurality of messages of a second plurality of existing access points; and maintaining a list of the one or more existing SSIDs included in the first and second plurality of messages. The method may further comprise comparing the list of the one or more existing SSIDs to the first SSID to determine whether the first SSID matches the at least one of the existing SSIDs.

In another aspect, an apparatus comprises a radio frequency (RF) transceiver to send and receive RF signals and a wireless processor coupled to the RF transceiver. The apparatus may be an integrated circuit having a first die comprising the RF transceiver and the wireless processor.

In an embodiment, the wireless processor comprises a configuration circuit to: receive a configuration request from a user, the configuration request comprising a first SSID; in response to the configuration request, enter into a monitor mode to identify one or more existing SSIDs of one or more existing access points in an environment with the apparatus; configure the apparatus with the first SSID when the first SSID does not match the one or more existing SSIDs; and obtain a renamed SSID from the user when the first SSID matches at least one of the one or more existing SSIDs.

In an embodiment, the configuration circuit is to inform the user when the first SSID matches the at least one of the one or more existing SSIDs, and obtain the renamed SSID. The configuration circuit, in response to receipt of the renamed SSID, may enter into the monitor mode to determine whether the renamed SSID matches the one or more existing SSIDs. The configuration circuit may configure the apparatus with the renamed SSID when the renamed SSID does not match the one or more existing SSIDs. The configuration circuit may further identify a security mode and a password provided by the user, and store the first SSID and the password in a non-volatile storage of the apparatus. The configuration circuit may prevent the configuration of the apparatus with the first SSID when the first SSID matches the at least one of the one or more existing SSIDs.

In yet another aspect, an access point comprises: a first RF transceiver to send and receive first RF signals; a second RF transceiver to send and receive second RF signals; and a wireless processor coupled to the first and second RF transceivers. The wireless processor may include a configuration circuit to: receive a configuration request from a user to configure the access point, the configuration request comprising a first SSID; in response to the configuration request, enter into a monitor mode to identify one or more existing SSIDs of one or more existing access points in an environment with the access point; and configure the access point with the first SSID when the first SSID does not match the one or more existing SSIDs. The access point may further include a non-volatile memory coupled to the wireless processor, the non-volatile memory to store the first SSID when the first SSID does not match the one or more existing SSIDs.

The access point also may include: a local area network interface to enable one or more wired devices to couple to the access point; and a wide area network interface to couple the access point to one or more networks. The non-volatile memory may store a password for the access point.

In an embodiment, during the monitor mode: the first RF transceiver is to receive a first plurality of messages of at least one first existing access point at a first frequency; and the second RF transceiver is to receive a second plurality of messages of at least one second existing access point at a second frequency. The configuration circuit may be configured to: compare the first SSID to one or more first existing SSIDs obtained in the first plurality of messages; compare the first SSID to one or more second existing SSIDs obtained in the second plurality of messages; and store the first SSID in the non-volatile memory to configure the access point with the first SSID, based on the comparison of the first SSID to the one or more first and second existing SSIDs.

DETAILED DESCRIPTION

In one or more embodiments, an access point is adapted to determine, during a configuration process, whether a proposed SSID is already being used in a vicinity of the access point. In this way, a situation in which different (or same) users configuring the same SSID with APs in closely located proximity can be avoided. And as a result, a lack of connectivity issue for users can be avoided.

At a high level, according to a method in accordance with an embodiment, during a configuration process, before saving a configured SSID to a non-volatile memory, the access point is controlled to enter into a monitor mode. In this monitor mode, the access point may scan across available channels to identify existing SSIDs in the vicinity or receive beacon messages having such existing SSIDs. As used herein, the term "monitor mode" means a mode in which an access point determines already existing SSIDs in a vicinity, by scanning, monitoring or any other means. Although embodiments are not limited in this regard, in one example an access point may be configured with multiple radios, including a first radio configured to operate at 2.4 gigahertz (GHz) and a second radio configured to operate at 5.0 GHz. As such, separate scans may be performed at each of these channels.

During a scan, the access point may receive probe responses from other access points in response to probe requests sent by the access point, or beacon messages from other access points in the vicinity. Or the access point may listen to beacons of already broadcasting access points (in the case of dynamic frequency selection (DFS) channels). These existing access points may send beacon messages at a periodic interval (e.g., between 100 and 300 milliseconds (ms) in some cases). The beacon messages include a configured SSID for the transmitting access point and additional information that may be available to inform users about available wireless services. Note also that some access points may provide multiple wireless networks, each having its own SSID. More generally, an access point may receive information regarding available access points in the vicinity by any other available means.

At a completion of this monitor mode, the access point may compare the existing SSIDs it receives from such probe response/beacon messages with the newly configured SSID. If the newly configured SSID matches any of the existing SSIDs, the access point may inform the user. For example, the access point can provide a message to the user, e.g., via a pop-up screen on a user device to indicate the duplication (e.g., "Duplicate SSID Detected in the vicinity. Would you like to continue configuring the same SSID? Option-1: Continue to configure, Option-2: Cancel to configure"). In this way, the access point may be configured with a unique (for its location) SSID, avoiding concerns with multiple locally present access points configured with the same SSID.

Figure 1:
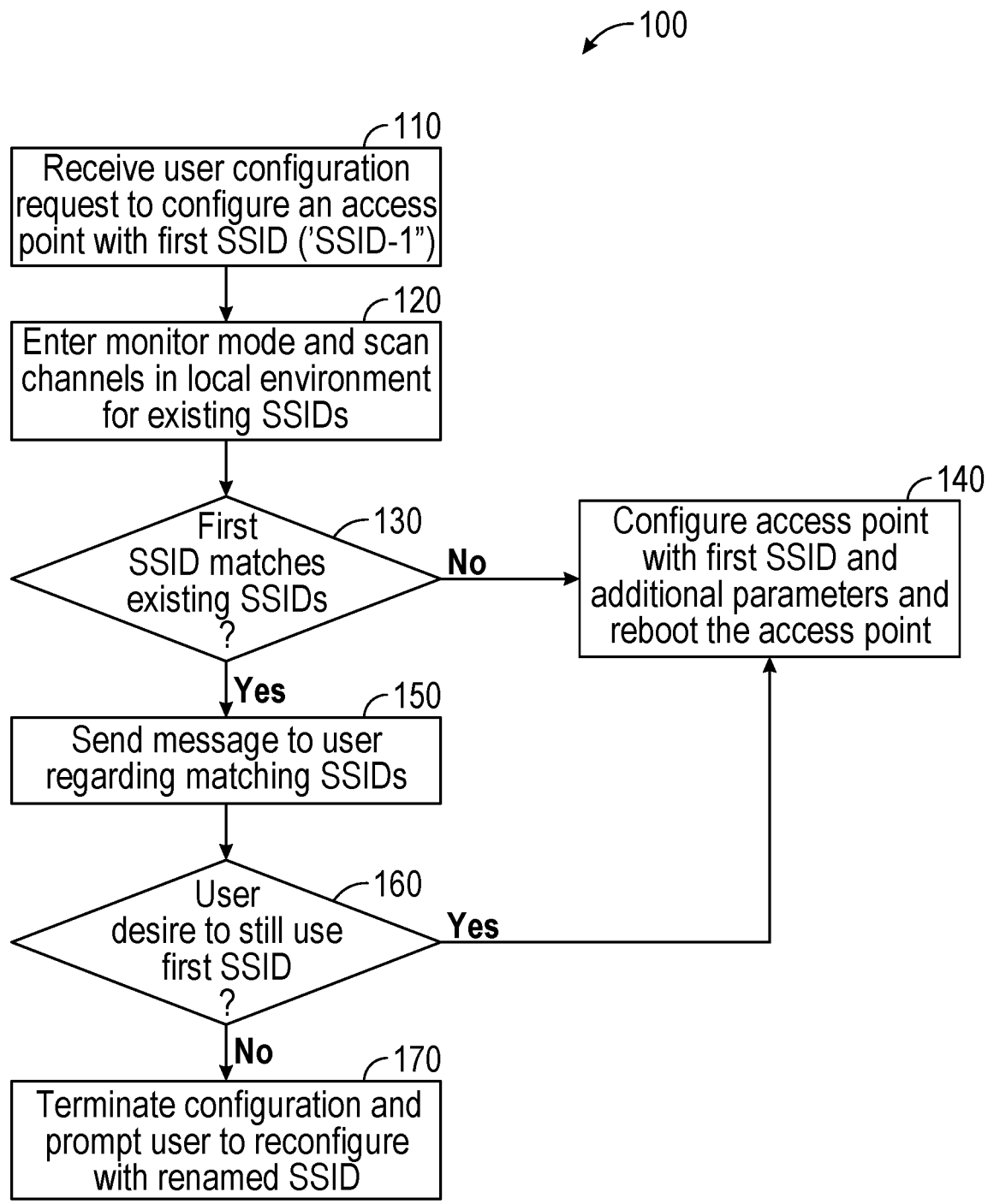
FIG. 1 is a flow diagram of a method in accordance with an embodiment.

Referring now to FIG. 1, shown is a flow diagram of a method in accordance with an embodiment. As shown in FIG. 1, method 100 is a method for configuring a wireless access point. As such, method 100 is from the view of the access point, which includes hardware circuitry, including a controller that may perform configuration operations, e.g., in response to a user request for configuration. This hardware circuitry may perform method 100 itself and/or in combination with firmware and/or software.

As illustrated, method 100 begins by receiving a user request to configure an access point (block 110). Such user request may be received when an access point is powered up for the first time. Or the user request may come when the access point is moved to another location, or for another reason in which the user desires to reconfigure the access point. As part of the configuration request, the user may provide a first SSID to act as an identifier for a wireless network associated with the access point. Note that typically the SSID may be a user (or factory)-derived name and is formed of alphanumeric characters. Typically, access points when shipped are provided with a default SSID, which may be modified to ensure there are no redundant SSIDs in the vicinity.

Of course while at block 110, the user request is described to include only an SSID, additional user-provided information may further be received in the access point during configuration operations, including an indication of whether security is desired and if so, what type of security. As examples, an access point may be secured according to one of Wired Equivalent Privacy (WEP), or more preferably some variant of Wi-Fi Protected Access (WPA) protection, according to either a WPA, WPA2, or WPA3 standard. Furthermore, for secure configuration, in addition to the type of security to be provided, the user (or factory) may provide a password as well.

As discussed above, one possible issue in configuring an access point is using an already-used SSID, where another access point in close proximity to the access point has this same SSID. Thus at block 120, the access point may enter into a monitor mode to scan the local environment. More specifically, the access point may be configured to scan all the allowed channels in the region configured on the access point to identify any existing SSIDs of other such access points.

If there are any such access points present, also at block 120 the access point may create a list of existing access points and their SSIDs and store the list in a temporary storage, e.g., within a memory of the access point. Next at diamond 130, it is determined whether the first SSID provided by the user as part of the configuration request matches any SSID in the scanned SSID list.

If not, control passes to block 140 where the access point may be configured with this first SSID. Also at block 140, additional configuration operations, including setting a security mode and password for the access point (if indicated) may occur. Note that this configuration process may include storing the SSID and other configuration parameters including security type and password in a non-volatile storage, e.g., a flash memory of the access point. Of course other operations within a configuration process may occur, such as selection of channel, operating mode (e.g., IEEE 802.11n/ 11ac, etc.), bandwidth and many other parameters.

Still with reference to FIG. 1, if it is determined at diamond 130 that the first SSID matches an existing SSID, control passes to block 150 where the access point may generate a message and send it to the user to indicate the duplicate SSID and ask whether the user still desires to maintain the duplicate SSID (diamond 160). If so, control passes to block 140 as discussed above. Otherwise if the user desires to change the SSID, control passes from diamond 160 to block 170 where the configuration process may be terminated and the user may be prompted to reconfigure the access point using a different SSID. On completion of this reconfiguration, a renamed SSID may be stored into the flash memory.

Note that in the implementation of FIG. 1, a user is given a choice as to whether the user desires to provide a different SSID that does not conflict. In other cases, the access point may be configured to prevent duplication and require the user to provide a different SSID, or auto-generate a non-conflicting SSID. Understand while shown at this high level in the embodiment of FIG. 1, many variations and alternatives are possible.

Figure 2:
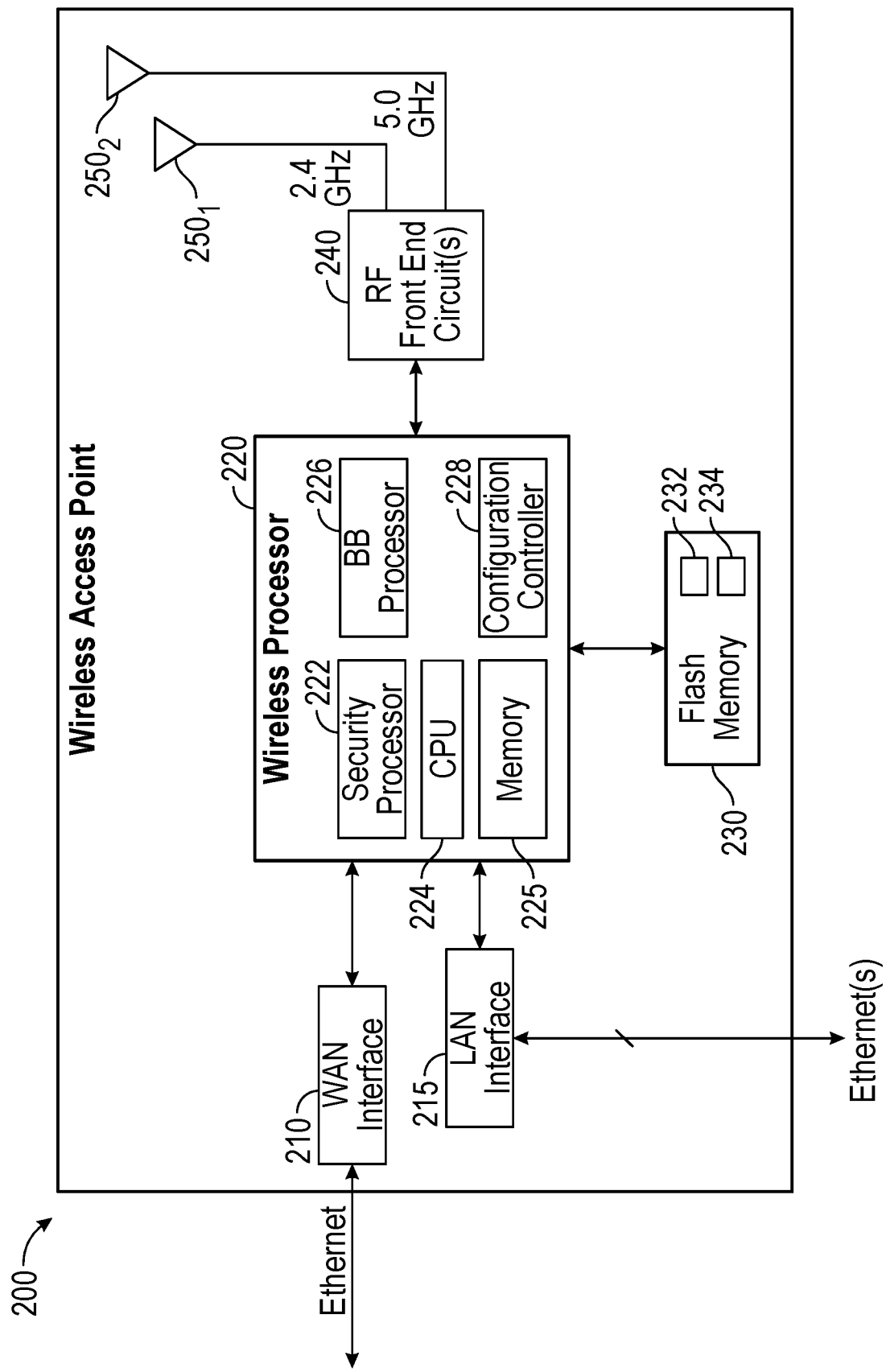
FIG. 2 is a block diagram of a wireless access point in accordance with an embodiment.

Referring now to FIG. 2, shown is a block diagram of a wireless access point in accordance with an embodiment. As shown in FIG. 2, the access point includes various circuitry to enable its configuration and operation to provide a WLAN in a local environment and interface with one or more remote networks, e.g., the internet via an Ethernet connection. Thus as shown, wireless access point 200 may couple to a wired network via an ethernet connection that couples to a wide area network (WAN) interface 210. In other embodiments, access point 200 may be implemented as a mobile hotspot. In any case, WAN interface 210 couples with a wireless processor 220. Details of wireless processor 220 are discussed further below. In turn, wireless processor 220 may communicate via a local area network (LAN) interface 215 with one or more local devices that may couple to access point 200 via wired connections via wired Ethernet connections. In addition, wireless processor 220 also couples to a flash memory 230 (or other non-volatile memory).

To enable wireless communications to occur, wireless processor 220 further couples to a radio frequency (RF) front end circuit(s) 240. RF front end circuit 240 may be configured, in a transmit direction, to receive incoming baseband signals from wireless processor 220 and perform various signal processing including up-conversion to RF, filtering, amplification or other gain control, to provide transmit signals to a selected one of multiple antennas $250_{1,2}$. RF front end circuit 240 also may be configured, in a receive direction, to receive incoming RF signals from to a selected one of multiple antennas $250_{1,2}$ and perform various signal processing including, filtering, amplification or other gain control, and down-conversion to baseband signals to be provided to wireless processor 220. As shown in FIG. 2, antenna $250_1$ may be configured to transmit and receive RF signals at a first frequency band, namely at 2.4 GHz, while antenna $250_2$ may be configured to transmit and receive RF signals at a second frequency band, namely at 5.0 GHz.

With further reference to FIG. 2, wireless processor 220 includes various constituent components. As seen, a security processor 222 may be present and may be used to enable secure communications, e.g., according to a given WPA or other security protocol. A central processing unit (CPU) 224 may be a main processing engine of wireless processor 220, and which acts as a host processor. As such, CPU 224 may interact with the other components, including security processor 222 and a memory 225. As further shown, a baseband processor 226 may be configured to perform baseband signal processing for both transmit and receive directions to provide baseband signals to RF front end circuit(s) 240 in a transmit direction and to receive incoming baseband signals in a receive direction and further process them.

As further shown in FIG. 2, wireless processor 220 also includes a configuration controller 228. In embodiments herein, configuration controller 228 may be a separate microcontroller, finite state machine or so forth (or may be included within CPU 224). In any event, configuration controller 228 may execute instructions to perform configuration of wireless access point 200 such as described above with regard to method 100 of FIG. 1. To this end, configuration controller 228 may execute instructions stored in flash memory 230, more specifically shown as a configuration program 232. As further shown, in response to a configuration of wireless access point 200 various configuration information, including an SSID, password, security type, among other information, may be stored in a configuration storage block 234 within flash memory 230. Understand while shown at this high level in the embodiment of FIG. 2, many variations and alternatives are possible.

Figure 3:
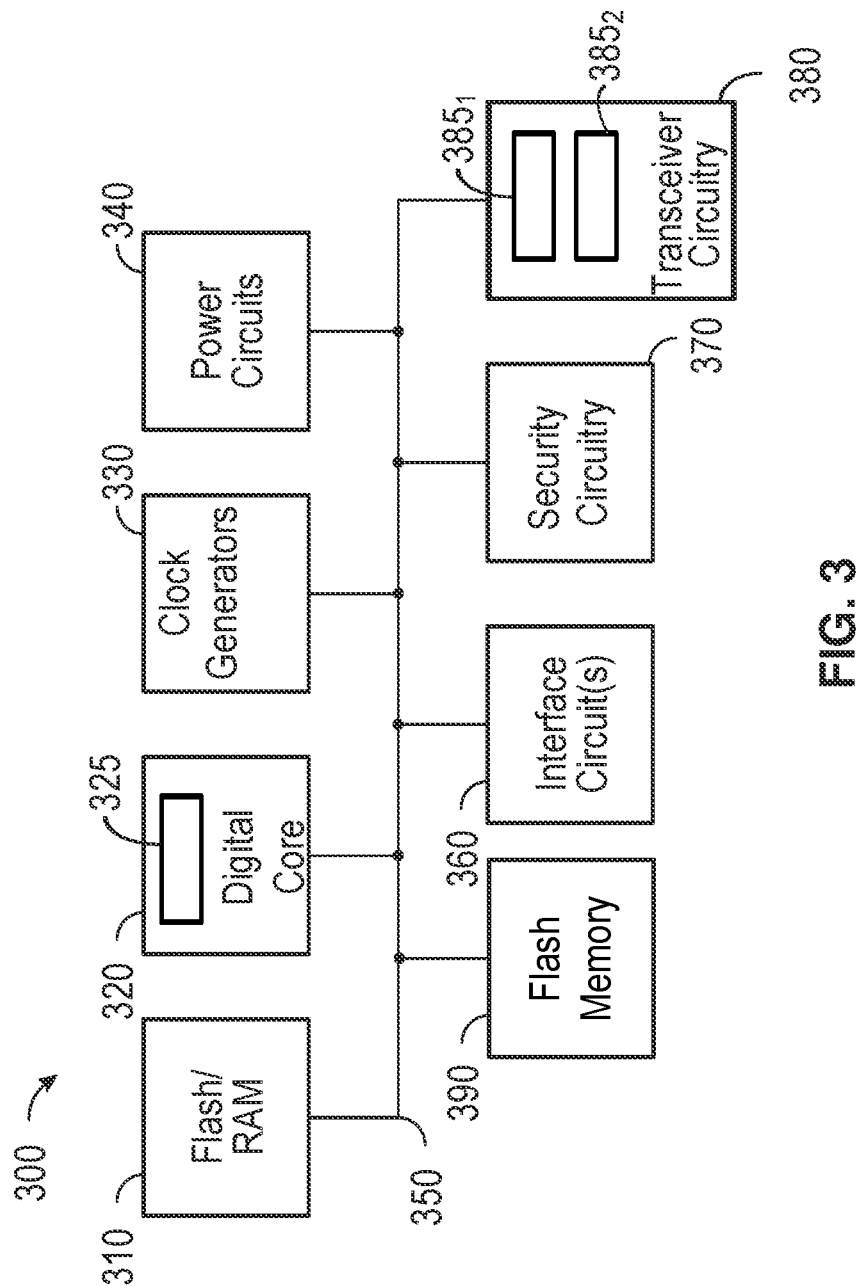
FIG. 3 is a block diagram of a representative integrated circuit that incorporates an embodiment.

Referring now to FIG. 3, shown is a block diagram of a representative integrated circuit 300 that includes configuration circuitry as described herein. In the embodiment shown in FIG. 3, integrated circuit 300 may be, e.g., a dual mode wireless transceiver that may operate according to one or more wireless protocols (e.g., WLAN and Bluetooth, among others) or other device that can be used in a variety of use cases. In one or more embodiments, the circuitry of integrated circuit 300 shown in FIG. 3 may be implemented on a single semiconductor die.

In addition to inclusion in an access point, router or other networking device, integrated circuit 300 may be included in a range of other devices including wearables, smart home devices, other consumer devices, or industrial, scientific, and medical (ISM) devices, among others.

In the embodiment shown, integrated circuit 300 includes a memory system 310 which in an embodiment may include volatile storage, such as RAM and non-volatile memory as a flash memory. As further shown integrated circuit 300 also may include a separate flash memory 390 (or other non-volatile memory), optionally. Flash memory 390 may be implemented as a non-transitory storage medium that can store instructions and data. Such non-volatile memory may store instructions, including instructions for performing access point configurations, and may further store configuration information including an SSID, as described herein.

Memory system 310 couples via a bus 350 to a digital core 320, which may include one or more cores and/or microcontrollers that act as a main processing unit of the integrated circuit. Digital core 320 is shown including a configuration circuit 325 that may perform a configuration as described herein (e.g., according to method 100 of FIG. 1). In turn, digital core 320 may couple to clock generators 330 which may provide one or more phase locked loops or other clock generator circuitry to generate various clocks for use by circuitry of the IC.

As further illustrated, IC 300 further includes power circuitry 340, which may include one or more voltage regulators. Additional circuitry may optionally be present depending on particular implementation to provide various functionality and interaction with external devices. Such circuitry may include interface circuitry 360 which may provide a LAN or other interface with various off-chip devices, and security circuitry 370 which may perform wireless security techniques.

In addition as shown in FIG. 3, transceiver circuitry 380 may be provided to enable transmission and receipt of wireless signals, e.g., according to one or more of a local area or wide area wireless communication scheme, such as Zigbee, Bluetooth, IEEE 802.11, IEEE 802.15.4, cellular communication or so forth. As shown, transceiver circuitry 380 includes dual transceiver circuits $385_{1,2}$ that can perform RF signal processing of multiple modes including WLAN and Bluetooth as examples. Understand while shown with this high level view, many variations and alternatives are possible.

Figure 4:
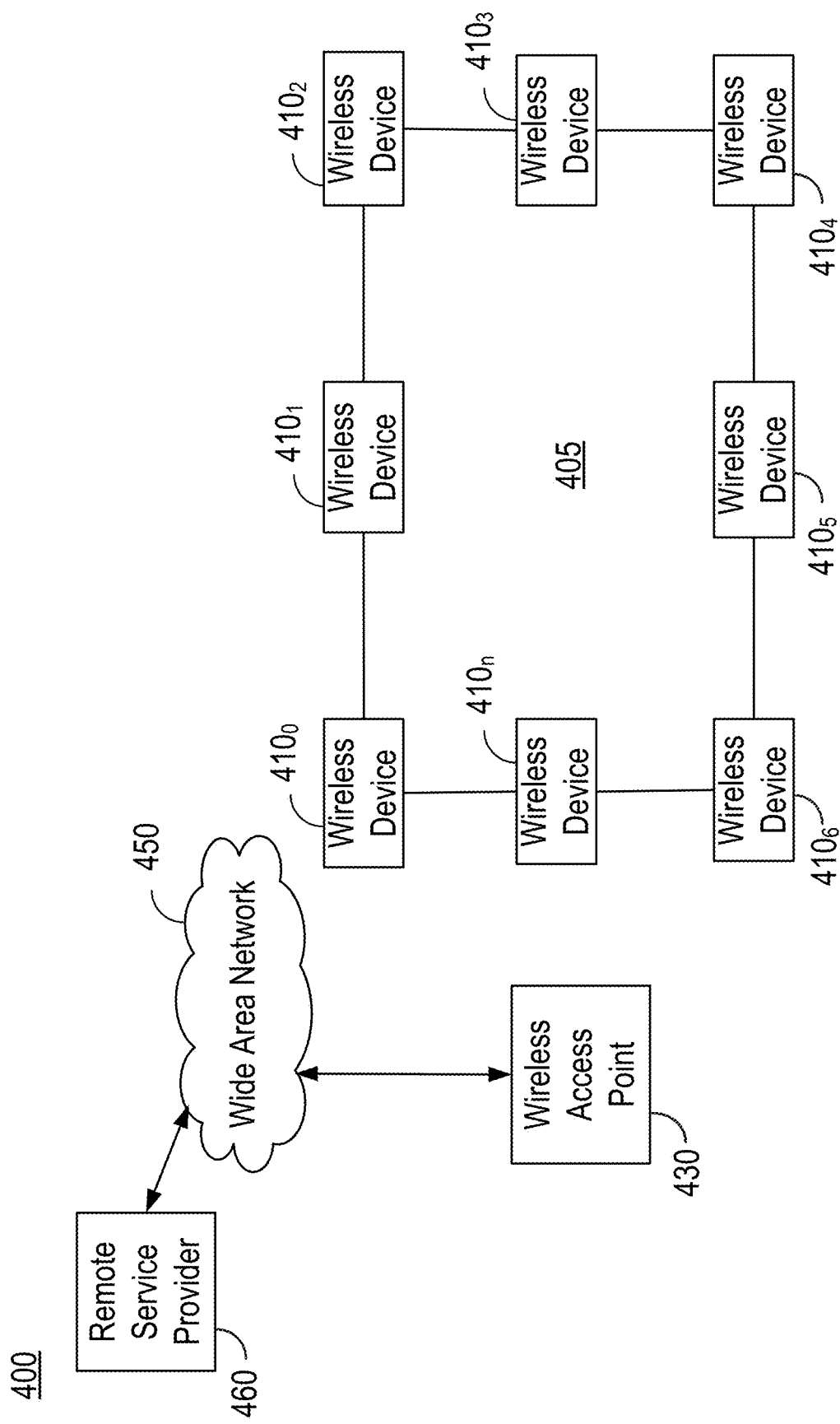
FIG. 4 is a high level diagram of a network in accordance with an embodiment.

ICs such as described herein may be implemented in a variety of different devices such as an access point, IoT device or so forth. Referring now to FIG. 4, shown is a high level diagram of a network in accordance with an embodiment. As shown in FIG. 4, a network 400 includes a variety of devices, including smart devices such as IoT devices, access points and remote service providers. In the embodiment of FIG. 4, a wireless network 405 is present, e.g., in a building having multiple wireless devices $410_{0-n}$.

As shown, wireless devices 410 couple to an access point 430 that in turn communicates with a remote service provider 460 via a wide area network 450, e.g., the internet. Understand that a while a single access point is shown in FIG. 4 for ease of illustration, in many local environments multiple access points may be present, and thus it may be desired to ensure that each such access point is configured with a different SSID. To this end, access point 430 may be configured to perform a method such as method 100 of FIG. 1 to ensure that each access point is configured with a locally exclusive SSID. Understand while shown at this high level in the embodiment of FIG. 4, many variations and alternatives are possible.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
   receiving, in an access point, a configuration request from a user, the configuration request comprising a first SSID;
   in response to the user request, entering into a monitor mode to identify one or more existing SSIDs of one or more existing access points separate from and in a local environment with the access point; and
   informing the user if the first SSID matches at least one of the existing SSIDs.

2. The method of claim 1, further comprising configuring the access point with the first SSID in response to identifying no existing SSIDs in the local environment that match the first SSID.

3. The method of claim 2, further comprising seeking a confirmation of the user to configure the access point with the first SSID, in response to the first SSID matching the at least one of the existing SSIDs.

4. The method of claim 2, further comprising terminating configuring the access point in response to receiving a user indication to use a different SSID.

5. The method of claim 2, wherein configuring the access point further comprises:
   configuring the access point for a security mode; and
   configuring a password for the access point identified by the user.

6. The method of claim 5, wherein configuring the access point further comprises storing the first SSID and the password in a non-volatile memory of the access point, and thereafter, rebooting the access point.

7. The method of claim 2, further comprising preventing the access point from being configured with the first SSID in response to the first SSID matching the at least one of the existing SSIDs.

8. The method of claim 1, further comprising in the monitor mode:
   receiving a first plurality of messages of a first plurality of existing access points;
   receiving a second plurality of messages of a second plurality of existing access points; and
   maintaining a list of the one or more existing SSIDs included in the first and second plurality of messages.

9. The method of claim 8, further comprising comparing the list of the one or more existing SSIDs to the first SSID to determine whether the first SSID matches the at least one of the existing SSIDs.

10. An apparatus comprising:
    a radio frequency (RF) transceiver to send and receive RF signals; and
    a wireless processor coupled to the RF transceiver, the wireless processor comprising a configuration circuit to:
      receive a configuration request from a user, the configuration request comprising a first SSID;
      in response to the configuration request, enter into a monitor mode to identify one or more existing SSIDs of one or more existing access points in an environment with the apparatus;
      configure the apparatus with the first SSID when the first SSID does not match the one or more existing SSIDs; and
      obtain a renamed SSID from the user when the first SSID matches at least one of the one or more existing SSIDs.

11. The apparatus of claim 10, wherein the configuration circuit is to inform the user when the first SSID matches the at least one of the one or more existing SSIDs, and obtain the renamed SSID.

12. The apparatus of claim 10, wherein the configuration circuit, in response to receipt of the renamed SSID, is to enter into the monitor mode to determine whether the renamed SSID matches the one or more existing SSIDs.

13. The apparatus of claim 12, wherein the configuration circuit is to configure the apparatus with the renamed SSID when the renamed SSID does not match the one or more existing SSIDs.

14. The apparatus of claim 10, wherein the configuration circuit is to further identify a security mode and a password provided by the user, and store the first SSID and the password in a non-volatile storage of the apparatus.

15. The apparatus of claim 10, wherein the configuration circuit is to prevent the configuration of the apparatus with the first SSID when the first SSID matches the at least one of the one or more existing SSIDs.

16. The apparatus of claim 10, wherein the apparatus comprises an integrated circuit having a first die comprising the RF transceiver and the wireless processor.

17. An access point comprising:
a first radio frequency (RF) transceiver to send and receive first RF signals;
a second RF transceiver to send and receive second RF signals;
a wireless processor coupled to the first and second RF transceivers, the wireless processor comprising a configuration circuit to:
receive a configuration request from a user to configure the access point, the configuration request comprising a first SSID;
in response to the configuration request, enter into a monitor mode to identify one or more existing SSIDs of one or more existing access points separate from and in an environment with the access point; and
configure the access point with the first SSID when the first SSID does not match the one or more existing SSIDs;
a non-volatile memory coupled to the wireless processor, the non-volatile memory to store the first SSID when the first SSID does not match the one or more existing SSIDs;
a local area network interface to enable one or more wired devices to couple to the access point; and
a wide area network interface to couple the access point to one or more networks.

18. The access point of claim 17, wherein the non-volatile memory is further to store a password for the access point.

19. The access point of claim 17, wherein during the monitor mode:
the first RF transceiver is to receive a first plurality of messages of at least one first existing access point at a first frequency; and
the second RF transceiver is to receive a second plurality of messages of at least one second existing access point at a second frequency.

20. The access point of claim 19, wherein the configuration circuit is to:
compare the first SSID to one or more first existing SSIDs obtained in the first plurality of messages;
compare the first SSID to one or more second existing SSIDs obtained in the second plurality of messages; and
store the first SSID in the non-volatile memory to configure the access point with the first SSID, based on the comparison of the first SSID to the one or more first and second existing SSIDs.

* * * * *